(12) United States Patent
Jones

(10) Patent No.: US 8,075,280 B2
(45) Date of Patent: Dec. 13, 2011

(54) COMPOSITE BLADE AND METHOD OF MANUFACTURE

(75) Inventor: William F. Jones, York, SC (US)

(73) Assignee: Siemens Energy, Inc., Orlando, FL (US)

( * ) Notice: Subject to any disclaimer, the term of this patent is extended or adjusted under 35 U.S.C. 154(b) by 675 days.

(21) Appl. No.: 12/205,966

(22) Filed: Sep. 8, 2008

(65) Prior Publication Data

US 2010/0061858 A1 Mar. 11, 2010

(51) Int. Cl.
*F01D 5/30* (2006.01)
*B21K 3/04* (2006.01)

(52) U.S. Cl. ............ 416/248; 29/889.7; 29/889.71
(58) Field of Classification Search .............. 416/248
See application file for complete search history.

(56) References Cited

U.S. PATENT DOCUMENTS

| | | | |
|---|---|---|---|
| 3,713,752 A * | 1/1973 | Kurti ................ 416/219 R |
| 3,734,642 A * | 5/1973 | Dixon ....................... 416/61 |
| 3,801,222 A * | 4/1974 | Violette ............... 416/220 R |
| 4,031,601 A * | 6/1977 | Staub et al. ............ 29/889.21 |
| 4,094,615 A | 6/1978 | Glenn |
| 4,111,603 A | 9/1978 | Stahl |
| 4,142,836 A | 3/1979 | Glenn |
| 4,207,029 A | 6/1980 | Ivanko |
| 4,236,873 A * | 12/1980 | Sherman et al. ........ 416/204 R |
| 4,247,259 A | 1/1981 | Saboe et al. |
| 4,417,854 A | 11/1983 | Cain et al. |
| 4,563,128 A | 1/1986 | Rossmann |
| 4,645,421 A | 2/1987 | Huether |
| 4,790,721 A | 12/1988 | Morris et al. |
| 4,834,616 A * | 5/1989 | Kasarsky et al. ......... 416/229 R |
| 5,318,406 A * | 6/1994 | Bardes .................... 416/223 A |
| 5,405,245 A | 4/1995 | Cornelius |
| 5,741,450 A * | 4/1998 | Monroe ..................... 264/102 |
| 5,743,713 A | 4/1998 | Hattori et al. |
| 6,065,938 A | 5/2000 | Bartsch |
| 6,132,175 A | 10/2000 | Cai et al. |
| 6,431,835 B1 | 8/2002 | Kolodziej et al. |
| 6,443,701 B1 | 9/2002 | Muhlbauer |
| 6,471,485 B1 | 10/2002 | Rossmann et al. |
| 6,514,046 B1 | 2/2003 | Morrison et al. |
| 6,666,651 B2 * | 12/2003 | Rust ...................... 416/204 R |
| 6,857,856 B2 | 2/2005 | Potter et al. |
| 7,229,254 B2 | 6/2007 | Bast et al. |
| 7,246,998 B2 | 7/2007 | Kovalsky et al. |
| 7,247,002 B2 | 7/2007 | Albrecht et al. |
| 7,329,101 B2 | 2/2008 | Carper et al. |
| 7,334,997 B2 | 2/2008 | Karafillis |
| 7,431,565 B2 * | 10/2008 | Hernandez et al. ....... 416/219 R |
| 2007/0258815 A1 | 11/2007 | Liang |

\* cited by examiner

*Primary Examiner* — Scott B Geyer

(57) ABSTRACT

A method of making a composite blade that is attachable to a rotating shaft using a conventional metal blade attachment. A blade is formed from a composite material with a blade root at one end thereof. A metallic member having an external shape conforming to a conventional metal blade root is shaped with an interior cavity having an opening for receipt of the blade root. Before the composite material is fully cured, a bladder is formed into or is inserted into an end of the blade root and inflated, thereby forcing the composite material into intimate contact with the interior cavity of the metallic member, thereby ensuring a fret-free interface upon final curing of the composite material. The interior cavity of the metallic member may be shaped or surfaced to improve the load carrying capability there between.

11 Claims, 5 Drawing Sheets

COMPOSITE BLADE AND METHOD OF MANUFACTURE

FIELD OF THE INVENTION

This invention generally relates to a blade for a rotating apparatus, and in particular to a method of attaching a composite blade to a rotating apparatus using a conventional metal blade attachment geometry.

BACKGROUND OF THE INVENTION

Metal blades are formed with an airfoil section for interface with a working fluid and a root section for attachment of the blade to a rotating metal disk. The root section may have any of a variety of known shapes (for example, dovetail, T-root, Christmas or fir tree, or a threaded attachment), but in each instance, the root section conforms to a corresponding attachment shape on the disk with a desired degree of looseness to facilitate the installation and removal of the blade. Slight movement between a metal blade root section and the corresponding attachment geometry on the disk during operation of the apparatus is accommodated by the inherent fretting resistance of the blade and disk materials.

Composite blades (for example epoxy, glass or ceramic materials) have advantages over metal blades, particularly their higher strength to weight ratio which allows for the design of lower weight parts. Composite blades have been used in compressors, fans, propellers and turbines. However, composite materials are not inherently fret-resistant, and the attachment of a composite blade to a metal disk is problematic. Special attachment techniques have been developed to address this problem, such as the use of a compliant interface layer and specially designed joints. Alternatively, composite disks have been designed with integrally formed composite blades. Nonetheless, improved attachment designs for composite blades are still desired.

BRIEF DESCRIPTION OF THE DRAWINGS

The invention is explained in the following description in view of the drawings that show.

DETAILED DESCRIPTION OF THE INVENTION

Figure 1:
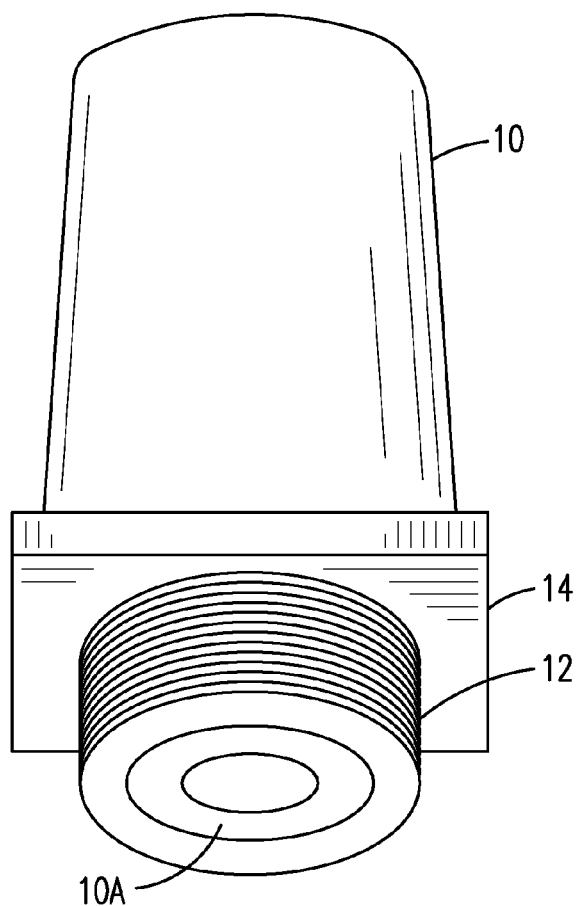
FIG. 1 is a perspective view of the blade and its attachment to a sleeve built in accordance with the teachings of the present invention.

The term composite material as used herein refers to a material comprising at least two elements working together to produce material properties that are different from those elements on their own. In practice, most composites comprise a bulk material (the "matrix") and a reinforcement material added primarily to increase the strength and stiffness of the matrix. This reinforcement material is usually in fiber form.

The present inventor has innovatively designed a composite blade and blade attachment scheme that is compatible with a standard metal blade holder/disk attachment geometry. The present design may be used for new applications, and advantageously may also be used to retrofit existing metal blades with like-in-kind composite blades without the need for a modification of the disk. When attaching composite structures, such as turbine blades, to conventional blade attachments (whether threaded or T-root) it is necessary to construct a blade that is formable and bondable to the blade attachment. This enables replacement of metallic blades with those made from composites (e.g., epoxy/glass fabric materials, epoxy/fiber materials, etc.) without the need for changing or modifying the blade holding parts. Moreover, this allows customization of the composite blades for improved performance. Furthermore, blades made of composite materials are substantially lighter in weight, typically by a factor of ten, than equivalent metal blades.

The method disclosed herein includes producing the composite blade using a conventional process such as molding or filament winding. Prior to full curing of the composite blade material, a metallic connecting element such as a sleeve or T-root is attached to the blade root where the blade normally attaches to the blade holder. The sleeve or T-root is installed and held in the correct orientation while the entire assembly is heated and cured in order to develop its final properties.

There are several possibilities for attachment of the metallic connecting sleeve or T-root to the blade. Typically, the bond between the metal and composite materials is not sufficient for long term operation due to wear and fretting that can cause damage to the reinforcing fibers or delaminations; however, in this case the surface of the sleeve or T-root that comes in contact with the composite materials is modified to provide an intimate contact in order to increase the bond strength and to eliminate fretting. In this manner, the composite blade material is attached to the inside of the metallic connecting element with a tight, fret-free attachment, while the metallic connecting element is formed on its outside surface to interface with the metal disk with a sufficient degree of looseness to facilitate the installation and removal of the blades, as with a standard metal blade. Such surface modifications include one or a combination of using a stepped sleeve, as shown in FIGS. 2 through 5; or shaping a tapered opening inside a T-root, as shown in FIGS. 6 through 10, or by incorporating metal fibers directly into the outer region of the composite material as shown in FIG. 11. In either of the first two cases, the inner surface may be knurled or treated by the Comeld™ process, which builds up metallic projections on the inner bonding surfaces. The Comeld™ process was developed by TWI (The Welding Institute), which uses the Surfi-Sculpt® process to prepare the inner surface of the metal sleeve or T-root for bonding by using an electron beam melting of the surface in order to raise surface projections. The knurling of the inner surfaces, or the treating of the inner surface with the Comeld process, increases the surface area of contact between the metal and the composite material, thereby improving the bond between the composite material and the metal. In the same manner, the use of metal fibers in the outer region of the composite material provides intimate bonding between the metal and non-metal materials.

The blade root is formed as required in order to connect to the airfoil portion of the blade, but also to match the form needed for the sleeve or T-root. Then, with the composite material being partially cured, such as approximately 70% cured in one embodiment, the sleeve or T-root is installed and a plug or bladder is used to force the composite material against the inner surface of the sleeve or T-root. The bladder may be built into the blade root during lay-up of the composite layers or it may be installed subsequent to lay-up. The bladder is then filled with a gas or resin material for inflation thereof.

Figure 2:
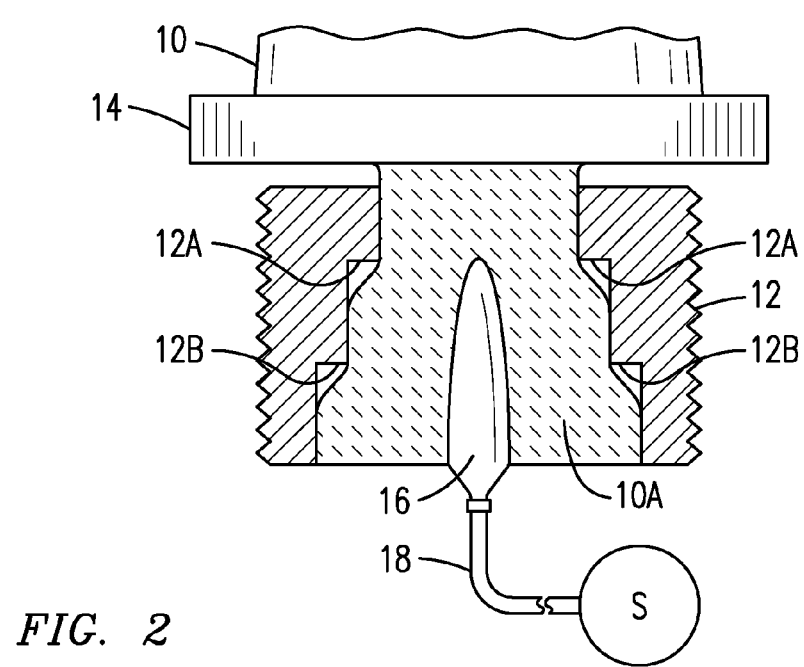
FIG. 2 is a cross-sectional view of the blade root within the sleeve during an early stage of manufacture.

Referring now to FIG. 1, a perspective view of the blade 10 and its attachment to a sleeve 12 built in accordance with the teachings of one embodiment of the present invention is shown. A flange or platform 14 is disposed at the interface between the sleeve 12 and the airfoil portion of the blade 10. The sleeve 12 has an outside geometry that corresponds to the respective attachment to the turbine disc (not shown), such as the threaded shape illustrated in FIG. 1. The cross-sectional view of FIG. 2 shows the blade 10 and flange 14 in partial view with the composite blade root 10A extending into the sleeve 12. In accordance with an embodiment of the invention, the sleeve 12 includes stepped segments 12A and 12B formed inside for gripping the composite blade. The blade root 10A is inserted into the sleeve 12 as shown in FIG. 2. Before full curing of the composite material and while it is still relatively pliable, a deflated bladder 16 is next inserted into the composite material of the blade root 10A (or was formed in position during lay-up of the composite material) and then coupled to a source S of compressed fluid such as air or resin by means of a tube 18.

Figure 3:
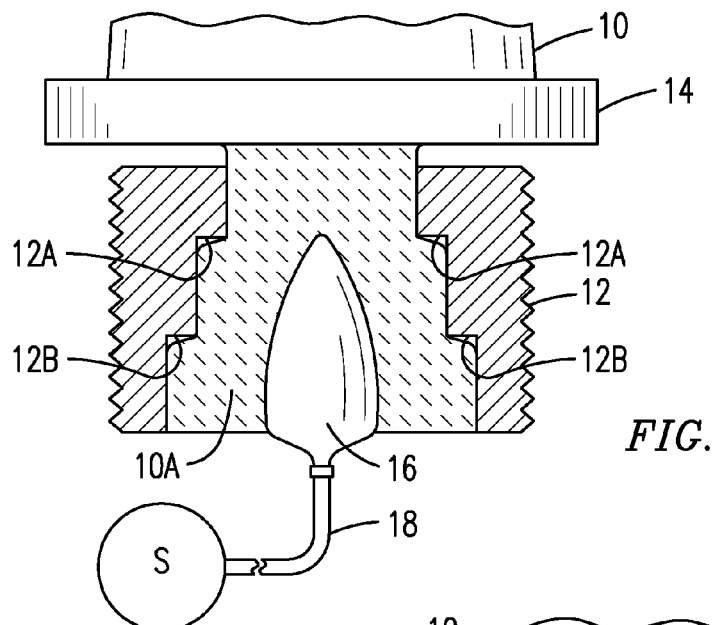
FIG. 3 is a cross-sectional view of the blade root within the sleeve during a subsequent stage of manufacture.
Figure 4:
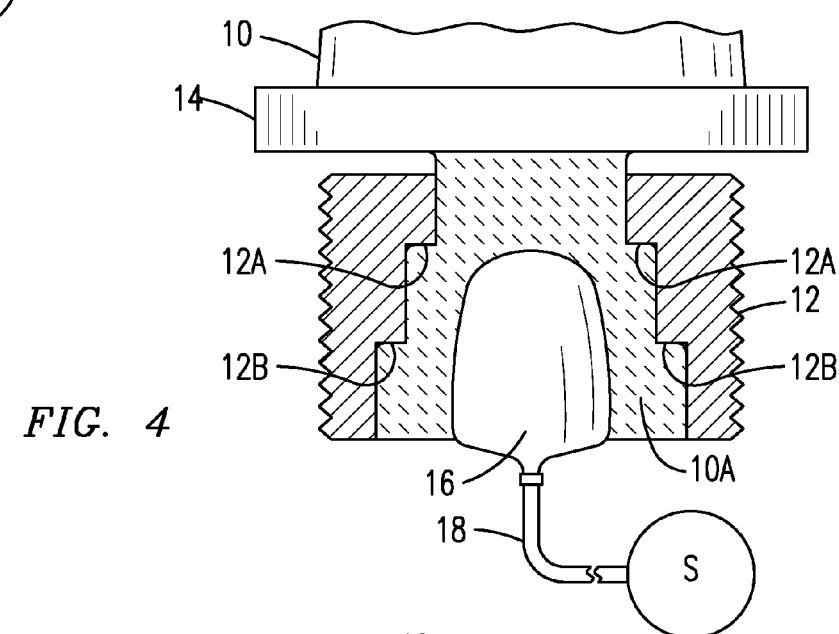
FIG. 4 is a cross-sectional view of the blade root within the sleeve during a later stage of manufacture.
Figure 5:
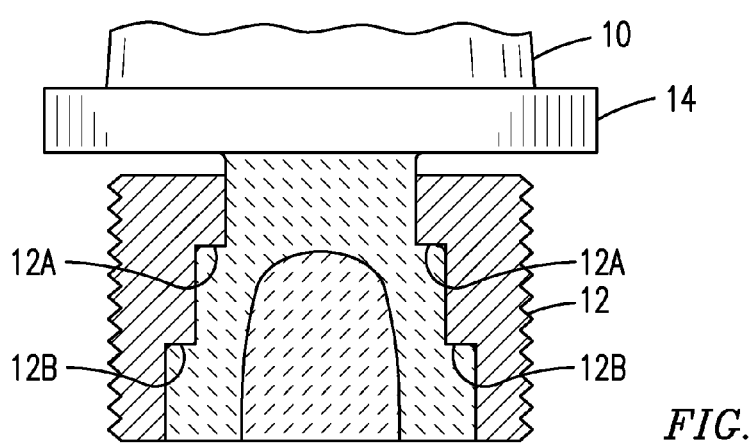
FIG. 5 is a cross-sectional view of the blade root within the sleeve after completion of manufacture.

As the compressed air or resin from the source S is pumped into the bladder 16, the bladder expands thereby forcing the composite material against the inside walls of the sleeve 12 and up against the stepped segments 12A and 12B, as shown in FIG. 3. Finally, after further expansion of the bladder 16, the composite material fully expands so as to fill all the gaps and spaces within the sleeve 12, as shown in FIG. 4. Where compressed air is used to inflate the bladder 16, the bladder is then removed and the opening formed thereby may be filled with additional material, which results in a completed structure as shown in FIG. 5. On the other hand, where resin is used to inflate the bladder 16, the bladder may remain in place and the entire structure is cured. The bladder remains in place during the inflation step due to a degree of adhesion with the soft resin, or due to a physical geometry created if the bladder is installed during the lay-up step, or with a mechanical fixture as necessary or desired for a particular embodiment.

Figure 6:
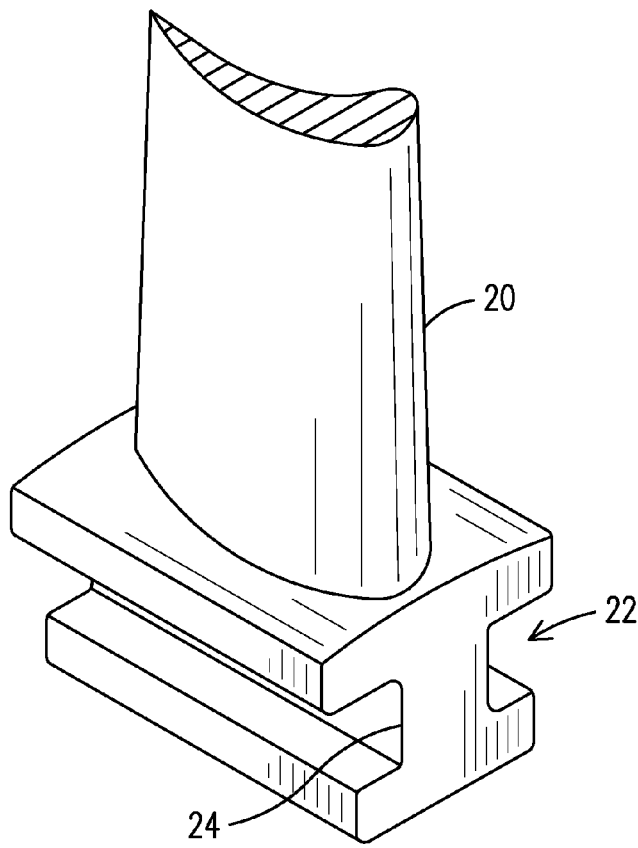
FIG. 6 is a perspective view of the blade and its attachment to a metal T-root.

FIG. 6 is a perspective view of a turbine blade 20 and its T-root 22 of another embodiment of the present invention. In accordance with this embodiment, the blade 20 is made of a composite material and the T-root 22 is made of a metal. The problem addressed by the present invention is the securing of the composite blade 20 to the metal T-root 22. As illustrated in FIGS. 1 through 5 and described hereinabove, the blade 10 includes a blade root (not visible in FIG. 6) that extends into the T-root 22. However, since the neck portion 24 of the T-root 22 is fairly narrow, there is not enough room to provide a stepped opening as described hereinabove. The solution disclosed herein is to provide a tapered opening for receiving the blade root; and, to further secure against blade root slippage within the metal T-root, the inner surfaces of the tapered opening are roughened by knurling or by use of the Comeld™ process.

Figure 7:
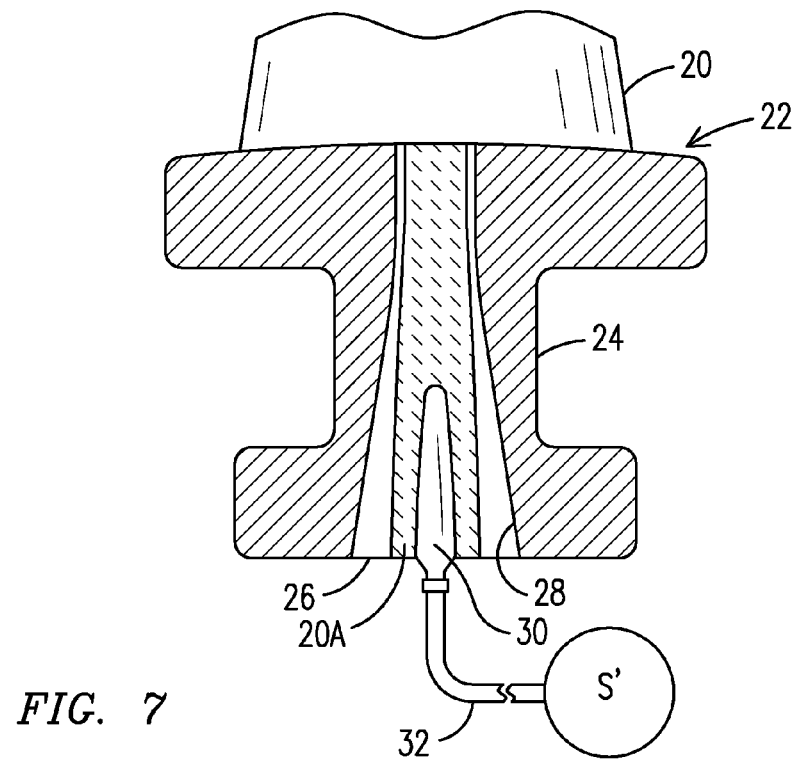
FIG. 7 is a cross-sectional view of the blade root within a T-root during an early stage of manufacture.

The process of manufacturing the blade 20 of FIG. 6 is discussed with reference to FIGS. 7-10. FIG. 7 shows a cross-sectional view of the blade root 20A and its attachment to the T-root 22 during an early stage of manufacture. Since the T-root 22 is more restricted in shape and size than the threaded sleeve 12 a different approach is required to secure the blade 20 in the T-root 22. First, a tapered opening 26 is formed in the T-root 22 for receipt of the blade root 20A. Next, the inner surface of the tapered opening 26 may be roughened such as by knurling or by application of the Comeld™. This step increases the surface area of contact with the composite material of the blade root 20A to provide an intimate, non-fretting contact there between. After insertion of the blade root 20A into the tapered opening 26, a deflated bladder 30 is coupled to a source S' of compressed fluid by means of a tube 32, all as shown in FIG. 7.

Figure 8:
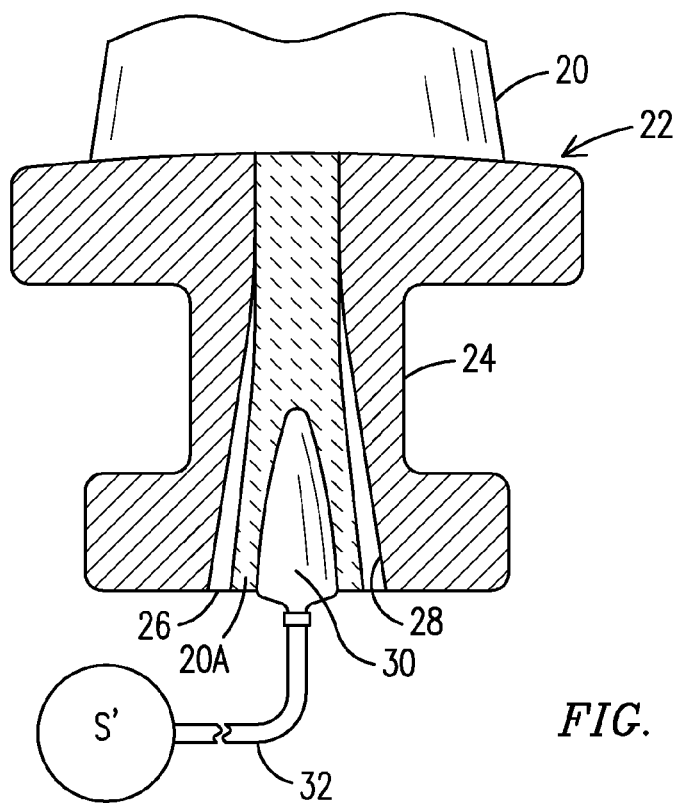
FIG. 8 is a cross-sectional view of the blade root within the T-root during a subsequent stage of manufacture.
Figure 9:
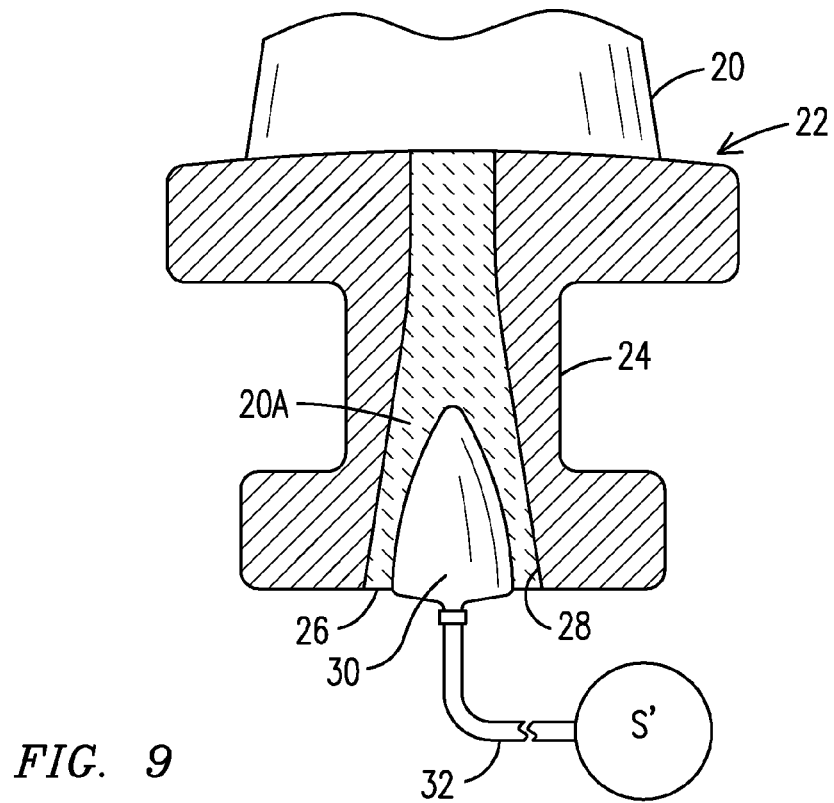
FIG. 9 is a cross-sectional view of the blade root within the T-root during a later stage of manufacture.

FIGS. 8 and 9 are cross-sectional views of the blade root 20A within the T-root 22 during subsequent stages of manufacture as the bladder 30 is inflated from the source S' by means of the tube 32. Finally, as the bladder 30 is fully inflated, the composite material of the blade root 20A is pressed firmly against the inner surfaces 28 of the tapered opening 26, as shown in FIG. 9.

Figure 10:
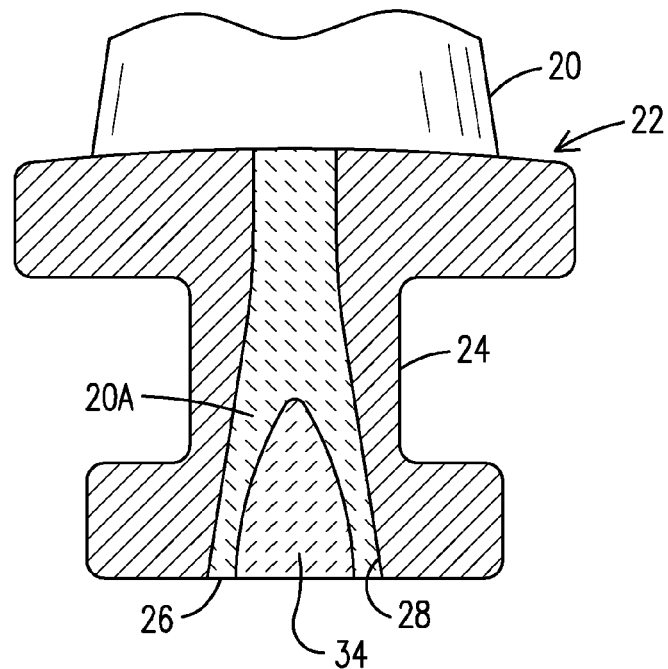
FIG. 10 is a cross-sectional view of the blade root within the T-root after completion of manufacture.
Figure 11:
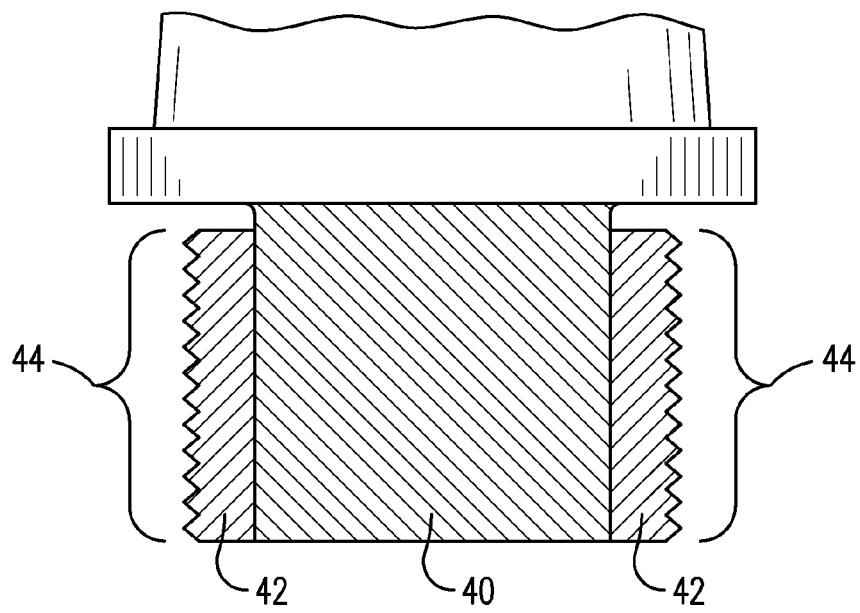
FIG. 11 is a cross-sectional view of the blade root where a metal fabric is wrapped around the root and threads are formed in the metal fabric.

FIG. 10 is a cross-sectional view of the blade root 20A within the T-root 22 after removal of the bladder 30 and back-filling of the opening with additional composite material 34 in the space left by the bladder.

It is noted that the two embodiments described above illustrate the use of a stepped interior cavity for the metallic sleeve member and a tapered interior cavity for the metallic T-root member. In both cases the opening at the proximate end of the metallic member is smaller than the opening at the distal end thereof. Accordingly, when completed, the composite blade is firmly bound inside of the metallic connecting element and securely attached thereto with a fret-free connection. As an option, the interior surfaces of the interior cavities can be roughened in order to raise surface projections. This technique increases the bonding between the composite material and the metal of the sleeve or T-root.

An alternative to the above-described process of using a distinct metallic part as the connecting element, the blade root portion of the composite blade may be produced using a layer of metallic fiber/fabric or mixture of metallic and non-metallic fibers/fabrics in its outer region to provide an integral fret-free attachment between the composite and metal materials. This embodiment may be especially useful for a threaded blade attachment, where the root is wrapped with a metallic fabric to a suitable thickness and then the threads are machined or formed into the metallic portion. FIG. 11 illustrates a cross-sectional view of a blade root 40, wherein a metal fabric 42 is wrapped around the root to a thickness of approximately 0.25 to 0.5 inches, for example. A thickness within this range should be suitable for machining threads 44 after the structure has cured. One may appreciate that the change from the composite reinforcing fibers/fabric to metal fibers/fabric may be an abrupt change, or the ratio of composite to metal fibers may be gradually changed from all composite to all metal over a predetermined depth of the root region. In either case, the interface between the fibers and the matrix material provides the desired intimate contact and fret-free attachment between the composite and metal portions of the blade, so that the outermost geometry of the blade root may conform to those of a standard metal blade for attachment to a standard metal disk.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A blade comprising:
   a composite material defining an airfoil and an extending blade root;
   a metallic connecting element surrounding the blade root;
   the metallic connecting element comprising an inner portion in intimate non-fretting attachment with the composite material and an outer portion defining a metal blade attachment geometry for allowing the blade to be removeably attached to a metal disk;
   wherein the metallic connecting element comprises a metallic fiber layer formed in an outer region of the blade root.

2. A blade comprising:
   a composite material defining an airfoil and an extending blade root;
   a metallic connecting element surrounding the blade root;
   the metallic connecting element comprising an inner portion in intimate non-fretting attachment with the composite material and an outer portion defining a metal blade attachment geometry for allowing the blade to be removeably attached to a metal disk;
   wherein the metallic connecting element comprises an interior cavity with an opening at a proximate end for receipt of the blade root and an opening at a distal end larger than the opening at the proximate end.

3. The blade of claim 2, wherein the interior cavity comprises a stepped geometry between the proximate end opening and the distal end opening.

4. The blade of claim 2, wherein the interior cavity comprises a tapered geometry between the proximate end opening and the distal end opening.

5. A blade comprising:
   a composite material defining an airfoil and an extending blade root;
   a metallic connecting element surrounding the blade root;
   the metallic connecting element comprising an inner portion in intimate non-fretting attachment with the composite material and an outer portion defining a metal blade attachment geometry for allowing the blade to be removeably attached to a metal disk;
   wherein the metallic connecting element comprises an interior cavity comprising a roughened surface.

6. A method of making a blade comprising the steps of:
   shaping from composite material a blade including a blade root;
   shaping a metallic member for receipt of said blade root, said metallic member comprising an exterior geometry adapted for attachment to a metal disc and comprising an Interior cavity formed therein with an opening in a proximate end for receipt of said blade root and an opening at the distal end thereof larger than said opening in said proximate end;
   when said composite material of said turbine blade is still pliable and not yet fully cured, inserting said blade root into said interior cavity;
   positioning a bladder in the distal end of said blade root within said interior cavity and attaching said bladder to a source of compressed fluid;
   inflating said bladder in order to expand said composite material into intimate contact with said interior cavity of said metallic member; and,
   continue curing said turbine blade with said metallic member attached until fully cured, whereby said composite blade is firmly secured to said metallic member.

7. The method as in claim 6 wherein said metallic member is shaped into a metallic sleeve adapted for attachment to said metal disc and having a stepped interior cavity between said proximate end and said distal end.

8. The method as in claim 7 further including the step of roughening interior surfaces of said interior cavity prior to insertion of said blade root.

9. The method as in claim 7, further comprising removing the bladder after the step of inflating and backfilling the space previously filled by the bladder with a filler material.

10. The method as in claim 6, further comprising positioning the bladder in the distal end of the blade root during the step of shaping the blade root from composite material.

11. A method of making a blade comprising the steps of:
    shaping of composite material a blade including a blade root;
    surrounding the composite material blade root with a metallic layer, an outer surface of the composite material blade root in conformal contact with an inner surface of the metallic layer, and an outer surface of the metallic layer comprising an attachment shape corresponding to a shape of a disk to which the blade will be attached during use; and
    curing the composite material;
    forming the metallic layer with metallic fiber on the composite material blade root to a suitable thickness; and,
    when said composite material is cured, forming the attachment shape in the metallic layer.

* * * * *